(12) United States Patent
Wei et al.

(10) Patent No.: US 11,507,020 B2
(45) Date of Patent: Nov. 22, 2022

(54) OPTICAL MEASUREMENT SYSTEM FOR OBTAINING AND ANALYZING SURFACE TOPOGRAPHY OF OBJECT

(71) Applicant: INDUSTRIAL TECHNOLOGY RESEARCH INSTITUTE, Hsinchu (TW)

(72) Inventors: Hsiang-Chun Wei, Hsinchu (TW); Chung-Lun Kuo, New Taipei (TW); Chia-Hung Cho, Hsinchu (TW); Chun-Wei Lo, Taichung (TW); Chih-Hsiang Liu, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 116 days.

(21) Appl. No.: 17/028,012

(22) Filed: Sep. 22, 2020

(65) Prior Publication Data

US 2021/0149337 A1    May 20, 2021

Related U.S. Application Data

(60) Provisional application No. 62/935,478, filed on Nov. 14, 2019.

(30) Foreign Application Priority Data

May 8, 2020    (TW) .................................. 109115426

(51) Int. Cl.
*G03H 1/04* (2006.01)
*G06T 15/08* (2011.01)
(Continued)

(52) U.S. Cl.
CPC ....... *G03H 1/0443* (2013.01); *G01B 9/02091* (2013.01); *G03H 1/0005* (2013.01);
(Continued)

(58) Field of Classification Search
CPC ...... G01B 9/02024; G01B 9/021; G01B 9/04; G06T 2007/20081
See application file for complete search history.

(56) References Cited

U.S. PATENT DOCUMENTS

| 8,937,722 B2* | 1/2015 | Cotte | G02B 21/365 |
| | | | 359/370 |
| 2015/0293498 A1 | 10/2015 | Picart et al. | |
| 2019/0049896 A1* | 2/2019 | Cheng | G03H 1/0005 |

FOREIGN PATENT DOCUMENTS

| CN | 110057743 A | 7/2019 |
| JP | 2017-219857 A | 12/2017 |

(Continued)

OTHER PUBLICATIONS

Park, YongKeun et al. "Quantitative phase imaging in biomedicine". Nature Photonics, vol. 12, Oct. 2018, pp. 578-589. (Year: 2018).*
(Continued)

*Primary Examiner* — Michael A Lyons
(74) *Attorney, Agent, or Firm* — Maschoff Brennan

(57) ABSTRACT

An optical measurement system comprises a polarization beam splitter for dividing an incident beam into a reference beam and a measurement beam, a first beam splitter for reflecting the measurement beam to form a first reflected measurement beam, a spatial light modulator for modulating the first reflected measurement beam to form a modulated measurement beam, a condenser lens for focusing the modulated measurement beam to an object to form a penetrating measurement beam, an objective lens for converting the penetrating measurement beam into a parallel measurement beam, a mirror for reflecting the parallel measurement beam
(Continued)

to form an object beam, a second beam splitter for reflecting the reference beam to a path coincident with that of the object beam, and a camera for receiving an interference signal generated by the reference beam and the object beam to generate an image of the object.

18 Claims, 7 Drawing Sheets

(51) Int. Cl.
*G01B 9/02091* (2022.01)
*G03H 1/00* (2006.01)

(52) U.S. Cl.
CPC ....... *G06T 15/08* (2013.01); *G03H 2001/005* (2013.01); *G03H 2001/0452* (2013.01); *G06T 2200/04* (2013.01); *G06T 2200/08* (2013.01); *G06T 2207/20081* (2013.01)

(56) References Cited

FOREIGN PATENT DOCUMENTS

| TW | I358538 B | 2/2012 |
|---|---|---|
| TW | 201312094 A | 3/2013 |
| TW | 201636597 A | 10/2016 |
| WO | WO-2016134211 A1 * | 8/2016 |

OTHER PUBLICATIONS

TW Office Action in Application No. 109115426 dated Feb. 4, 2021.
Boniface, et al., "Transmission-matrix-based point-spread-function engineering through a complex medium," Optica, vol. 4, Issue 1, pp. 54-59 (Jan. 2017).
Yoon, et al., "Identification of non-activated lymphocytes using three-dimensional refractive index tomography and machine learning," Scientific Reports, pp. 1-10 (Jul. 27, 2017).

* cited by examiner

OPTICAL MEASUREMENT SYSTEM FOR OBTAINING AND ANALYZING SURFACE TOPOGRAPHY OF OBJECT

CROSS-REFERENCE TO RELATED APPLICATIONS

This non-provisional application claims priority under 35 U.S.C. § 119(a) on provisional application No(s). 62/935,478 filed in U.S.A. on Nov. 14, 2019, and on patent application No(s). 109115426 filed in Taiwan (R.O.C.) on May 8, 2020, the entire contents of which are hereby incorporated by reference.

BACKGROUND

1. Technical Field

This disclosure relates to an optical measurement system, and particularly to an optical measurement system including optical imaging architecture.

2. Related Art

Chemical composition analysis techniques are widely used, such as semiconductor detection, cell sorting, food ingredient analysis, and so on. Common chemical composition analysis techniques include Fluorescence confocal microscopy, Mass spectrometry, and Raman spectroscopy. In addition, Magnetic-activated cell sorting (MACS) is also commonly used in cell sorting applications.

However, these common analytical techniques face some problems in application. In the case of Fluorescence confocal microscopy, it has to label the object to be measured and is time-consuming; in the case of Mass spectrometry, it does not have the function of multi-cell inspection, and is not applicable for the analysis of living cells; in case of Raman spectroscopy, it is time-consuming, has a huge optical imaging architecture, and does not have the function of multi-cell inspection; in case of MACS technology, it has to label the object to be measured, is time-consuming, and does not have the function of multi-cell inspection, and furthermore, the magnetic beads used for labeling may cause unexpected cellular responses.

SUMMARY

According to one or more embodiment of this disclosure, an optical measurement system comprises a polarization beam splitter, a first beam splitter, a spatial light modulator, a condenser lens, an objective lens, a mirror, a second beam splitter and a camera. The polarization beam splitter divides an incident beam into a reference beam and an original measurement beam. The first beam splitter receives the original measurement beam and reflects the original measurement beam to form a first reflected measurement beam. The spatial light modulator receives the first reflected measurement beam and modulates a reflection direction of the first reflected measurement beam to form a modulated measurement beam. The condenser lens receives the modulated measurement and focuses the modulated measurement beam to an object to be measured, wherein the modulated measurement beam penetrates the object to be measured to form a penetrating measurement beam. The objective lens receives the penetrating measurement beam and converts the penetrating measurement beam into a parallel measurement beam. The mirror receives the parallel measurement beam and reflects the parallel measurement beam to form a second reflected measurement beam. The second beam splitter receives the reference beam and reflects the reference beam to a path coincident with a path of the second reflected measurement beam, wherein the reference beam interferes with the second reflected measurement beam to generate an interference signal. The camera receives the interference signal to generate an original image, wherein the original image comprises a phase distribution image having surface topography representative of the object to be measured.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
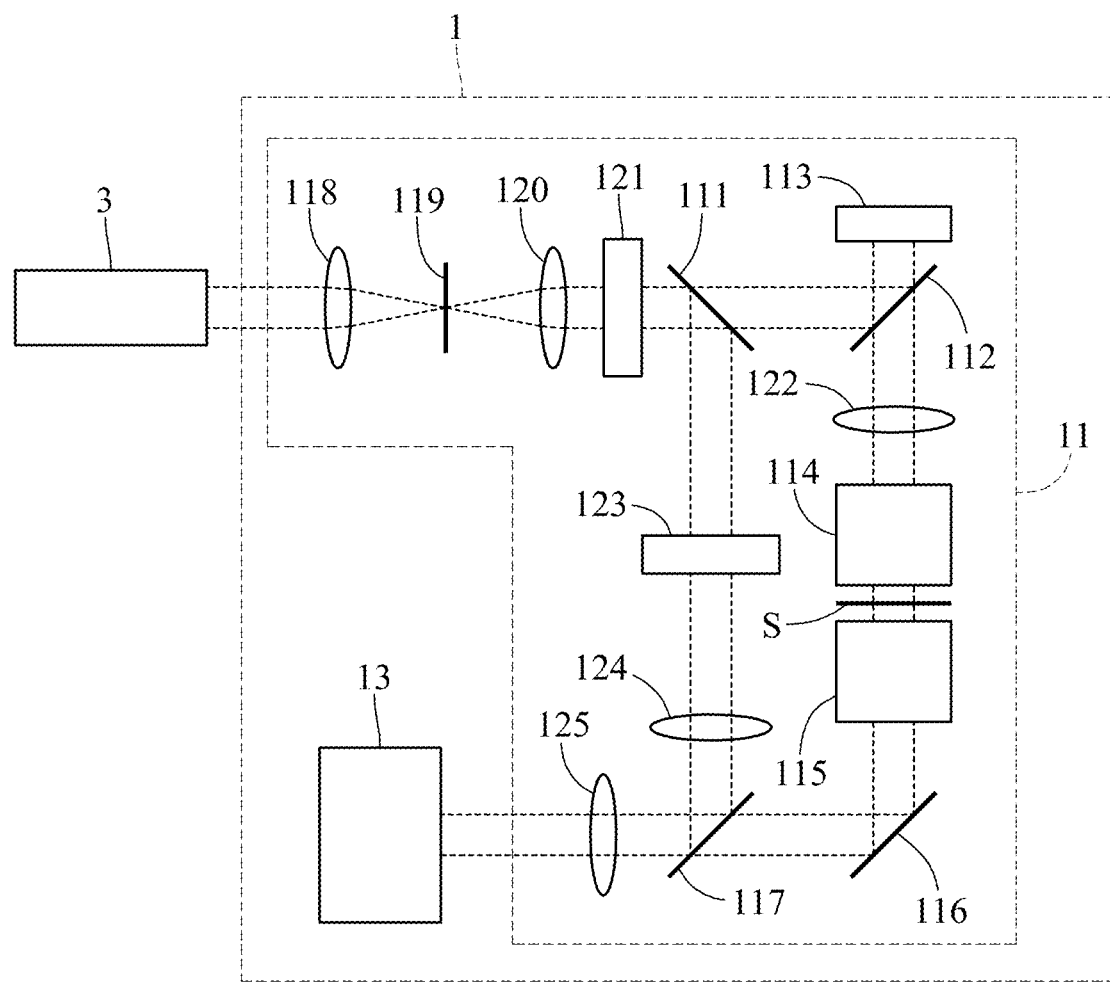
FIG. 1 is a function block diagram of an optical measurement system 1 according to an embodiment of this disclosure.

Please refer to FIG. 1, a function block diagram of an optical measurement system 1 according to an embodiment of this disclosure. As shown in FIG. 1, the optical measurement system 1 comprises an optical element group 11 and a camera 13. The optical element group 11 comprises multiple optical elements that can form a measurement optical path and a reference optical path, wherein the measurement optical path represents an optical path passing through an object to be measured. The object to be measured can be a biomolecule such as a cell, or a non-biological molecule such as a polystyrene ball (PS ball), a semiconductor element. During the measurement process, the object to be measured can be placed in a transparent liquid and carried on a carrier S such as a glass slide. Therefore, after passing through the object to be measured, the measurement beam has phase information of the surface topography of the object to be measured. The optical element group 11 can divide an incident beam from a light source 3 into two beams respectively passing through the measurement optical path and the reference optical path, and make the two beams interfere with each other to generate an interference signal. The light source 3 can be changed according to the category of the object to be measured; for example, the laser is a light source suitable for cells. The camera 13 can receive the interference signal which is generated from the interference between the two beams respectively passing through the measurement optical path and the reference optical path, and accordingly generate an original image associated with the surface topography of the object to be measured. The camera 13 can be composed of charge-coupled devices (CCD), CMOS active pixel sensors or other photosensitive elements.

The following further describes the optical elements included in the optical element group 11. The optical element group 11 mainly comprises a polarization beam splitter (PBS) 111, a first beam splitter (BS) 112, a spatial light modulator (SLM) 113, a condenser lens (CL) 114, an objective lens (OL) 115, a mirror 116 and a second beam splitter 117. As aforementioned, the optical element group 11 can form the measurement optical path and the reference optical path. More specifically, the measurement optical path passes through the polarization beam splitter 111, the first beam splitter 112, the spatial light modulator 113, the condenser lens 114, the objective lens 115, the mirror 116 and the second beam splitter 117; the reference optical path passes through the polarization beam splitter 111 and the second beam splitter 117. More particularly, the architecture of the optical element group 11 is set up based on Mach-Zehnder digital holography.

In FIG. 1, the paths of light beams are exemplarily illustrated by dotted lines. In the following, the architecture of the optical element groups is described using the travel of light beams. The polarization beam splitter 111 divides an incident beam from the light source 3 into an original measurement beam and a reference beam. The first beam splitter 112 receives the original measurement beam and reflects the original measurement beam to form a first reflected measurement beam (i.e. the reflected original measurement beam). The spatial light modulator 113 receives the first reflected measurement beam and modulates the reflection direction of the first reflected measurement beam to form a modulated measurement beam (i.e. the first reflected measurement beam whose reflection direction is modulated). The condenser lens 114 receives the modulated measurement beam and focuses the modulated measurement beam to the object which is to be measured and placed on the carrier S so as to form a penetrating measurement beam (i.e. the modulated measurement beam penetrating the object to be measured). The objective lens 115 receives the penetrating measurement beam and converts the penetrating measurement beam into a parallel measurement beam. The mirror 116 receives the parallel measurement beam and reflects the parallel measurement beam to form a second reflected measurement beam (i.e. the reflected parallel measurement beam, also referred to as an object beam). The second beam splitter 117 receives the reference beam and reflects the reference beam to a path coincident with the path of the second reflected measurement beam, so that the reference beam interferes with the second reflected measurement beam so as to generate an interference signal.

In particular, the spatial light modulator 113 can be a liquid crystal on silicon (LCoS), or a digital micro-mirror device (DMD) used in digital light processing (DLP). The spatial light modulator 113 can be controlled to change the direction of the beam projected toward the condenser lens 114 and the object to be measured, so as to perform a 360-degree scan of the object to be measured with the objective lens 115. Through the combination of the aforementioned polarization beam splitter 111 and spatial light modulator 113, the intensity of the reference beam formed by the optical element group 11 is approximately equal to the intensity of the measurement beam for projecting on the object to be measured (i.e. modulated measurement beam), thereby avoiding the problem of poor imaging caused by the too large intensity difference between the reference beam and the measurement beam is too large.

As shown in FIG. 1, besides the optical elements as above mentioned, the optical element group 11 can further comprise a first lens 118, a pinhole element 119, a second lens 120, a first half-wavelength plate (HWP) 121, a third lens 122, a second half-wavelength plate 123, a fourth lens 124 and a fifth lens 125. The first lens 118, the pinhole element 119, the second lens 120 and the first half-wavelength plate 121 are disposed on the path of the incident beam to the polarization beam splitter 111; that is, they are disposed between the light source 3 and the polarization beam splitter 111. The first lens 118, the pinhole element 119 and the second lens 120 can form a spatial filter for filtering out spatial noise of the incident beam. The first half-wavelength plate 121 is configured for rotating the polarization direction of the incident beam in which the spatial noise is filtered out by $\pi/2$. The third lens 122 is disposed on the path of the modulated measurement beam to the condenser lens 114; that is, the third lens 122 is disposed between the first beam splitter 112 and the condenser lens 114. The third lens 122 is configured for focusing the modulated measurement beam that is originally parallel light on the same plane. The second half-wavelength plate 123 and the fourth lens 124 are disposed on the path of the reference beam to the second beam splitter 117; that is, they are disposed between the polarization beam splitter 111 and the second beam splitter 117. The second half-wavelength plate 123 is configured for rotating the polarization direction of the reference beam reflected by the second beam splitter to be the same as the polarization direction of the second reflected measurement beam after penetrating the second beam splitter 117. The fourth lens 124 is configured for modulating the wave front. The fifth lens 125 is disposed on the path of the inference signal to the camera 13; that is, the fifth lens 125 is disposed between the second beam splitter 117 and the camera 13. The fifth lens 125 serves as a imaging lens.

The first lens 118, the pinhole element 119, the second lens 120, the first half-wavelength plate 121, the third lens 122, the second half-wavelength plate 123, the fourth lens 124 and the fifth lens 125 as above mentioned are optionally disposed. In an embodiment, besides the polarization beam splitter 111, the first beam splitter 112, the spatial light modulator 113, the condenser lens 114, the objective lens 115, the mirror 116 and the second beam splitter 117, the optical element group 11 further comprises the first half-wavelength plate 121. In another embodiment, besides the polarization beam splitter 111, the first beam splitter 112, the spatial light modulator 113, the condenser lens 114, the objective lens 115, the mirror 116 and the second beam splitter 117, the optical element group 11 further comprises the spatial filter formed by the first lens 118, the pinhole element 119 and the second lens 120, and further comprises the first half-wavelength plate 121.

Figure 2:
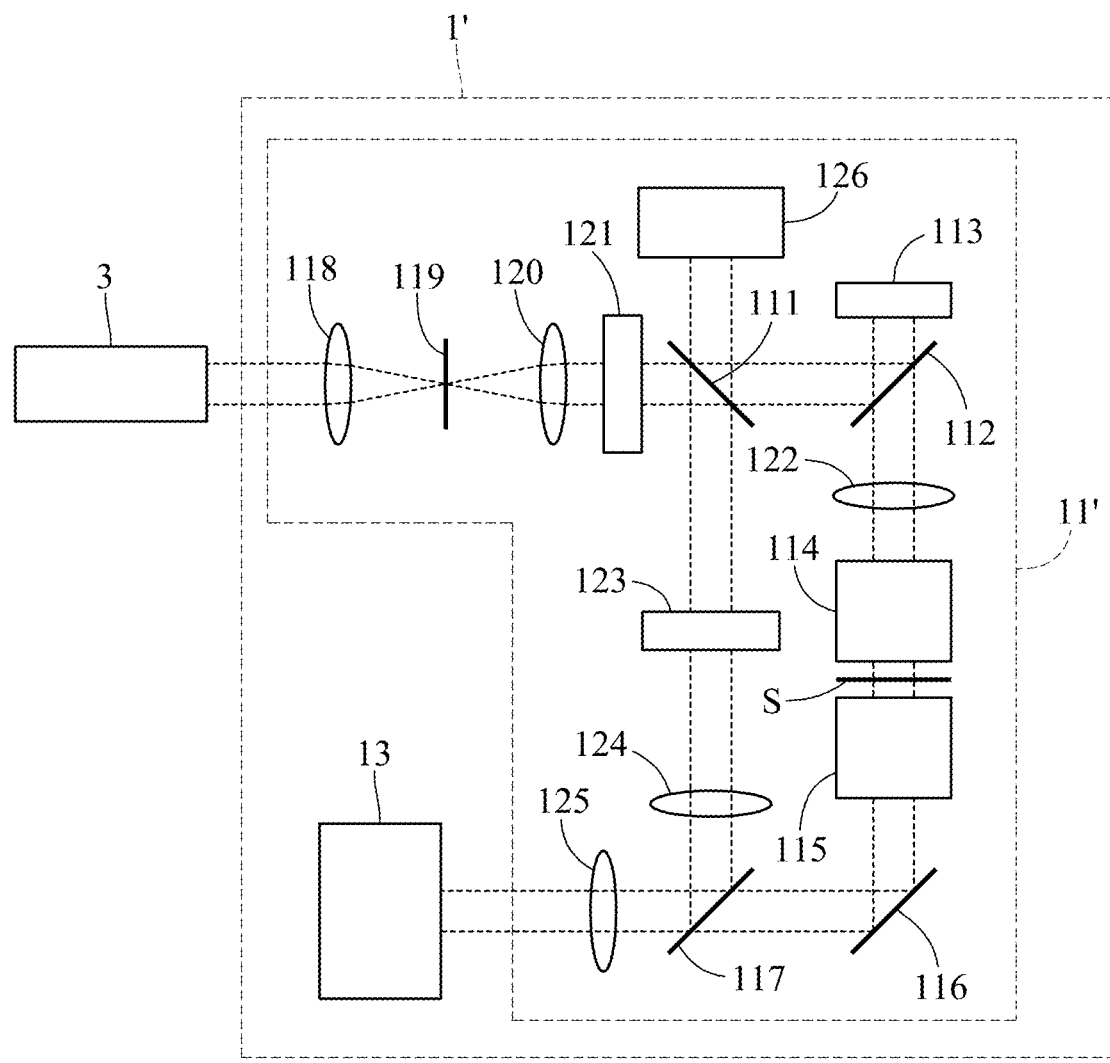
FIG. 2 is a function block diagram of an optical measurement system 1 according to another embodiment of this disclosure.

This disclosure also provides an optical measurement system with an optical element group having another configuration. Please refer to FIG. 2, a function block diagram of an optical measurement system 1' according to another embodiment of this disclosure. As shown in FIG. 2, the optical measurement system 1' is substantially the same as the optical measurement system 1 shown in FIG. 1, so the functions of the same elements and the configuration of light paths are as described in the above embodiments and will not be repeated here. The optical measurement system 1' in FIG. 2 differs from the optical measurement system 1 in FIG. 1 in that the optical element group 11' of the optical measurement system 1' further comprises a light emitting diode 126, wherein the light emitting diode 126 is configured for serving as a light source for a bright field microscope.

Figure 3:
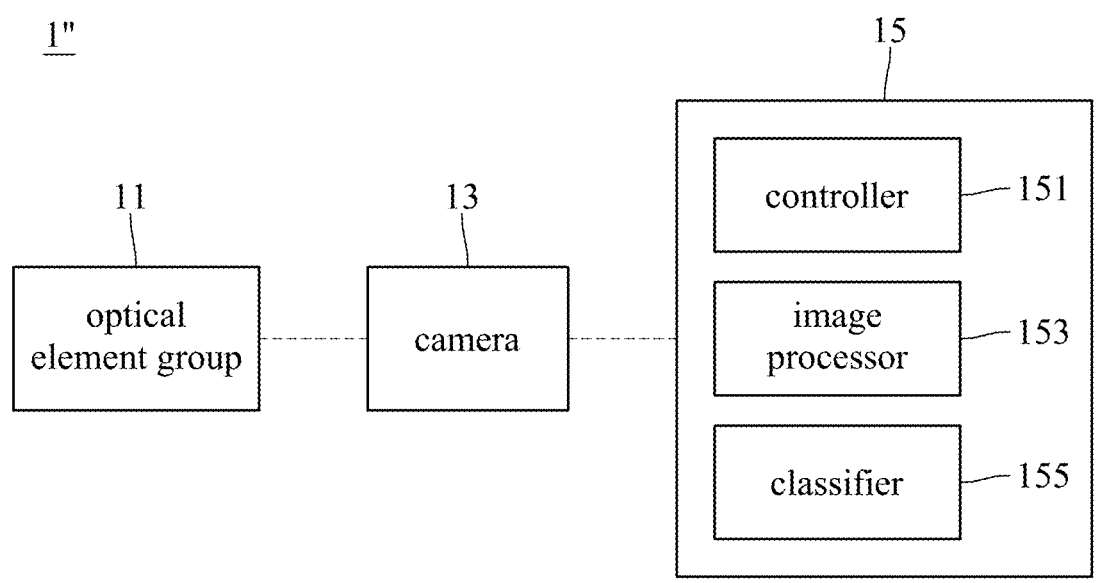
FIG. 3 is a function block diagram of an optical measurement system 1 according to yet another embodiment of this disclosure.

This disclosure also provides an optical measurement system including a processing device. Please refer to FIG. 3, a function block diagram of an optical measurement system 1" according to yet another embodiment of this disclosure. As shown in FIG. 3, the optical measurement system 1" comprises an optical element group 11, a camera 13 and a processing device 15, wherein the optical elements included in the optical element group 11 and the function of the camera 13 are the same as those in the aforementioned embodiment of FIG. 1, and will not be repeated here. Alternatively, the optical element group 11 of the optical measurement system 1" can be replaced with the optical element group 11' shown in FIG. 2, and the optical elements thereof are the same as those in the embodiment of FIG. 2, and will not be repeated here.

The processing device 15 can comprise a controller 151, an image processor 153 and a classifier 155, and be connected with the camera 13 by wireless or wired means. In particular, the controller 151, the image processor 153 and the classifier 155 of the processing device 15 can be multiple hardware components installed in the same device (such as a computer), or multiple hardware devices that are independently set up. In another embodiment, the methods for control, image processing and classification performed by the controller 151, the image processor 153 and the classifier 155 as described later can be various firmware or software stored in the computer, and be executed by the processor of the computer.

The controller 151 can control the spatial light modulator 113 in the optical element group 11 to change the direction of the beam projected toward the condenser lens 114 and the object to be measured, so that the camera 13 can capture multiple original images respectively corresponding to different projection directions. In other words, the controller 151 can control the spatial light modulator to scan the object to be measured, especially to scan 360 degrees. The image processor 153 can obtain the original images from the camera 13, and separate the original image into a phase distribution image and an amplitude distribution image, particularly by a field retrieval algorithm. The phase distribution image can represent the surface tomography of the object to be measured, and the information represented by the phase distribution image can be used in the generation of a three-dimensional (3D) image that represents the refractive index (RI) distribution of the object to be measured. The image processor 153 can obtain multiple phase distribution images from the original images corresponding to different projection directions as aforementioned, and use the information of every phase distribution image for reconstructing the 3D profile of the object to be measured, particularly by a back propagation algorithm, wherein the 3D profile serves as the above-mentioned 3D image. The 3D image reconstructed by the image processor 153 can be stored in internal memory or external memory. The above-mentioned combination of the imaging method based on digital holography microscopy, the scanning mechanism and the back propagation algorithm can be referred to as an optical diffractive tomography (ODT) method.

More particularly, the information represented by the phase distribution image and the reconstructed 3D image as aforementioned can satisfy the following equation:

$$U_{Rytov}(f_x, f_y, z^+ = 0) = \frac{1}{j4\pi f z}(F_x, F_y, F_z),$$

wherein $U_{Rytov}(f_x, f_y, z^+=0)$ represents the 3D image, and $(F_x, F_y, F_z)$ represents the information represented by the phase distribution image.

Figure 4:
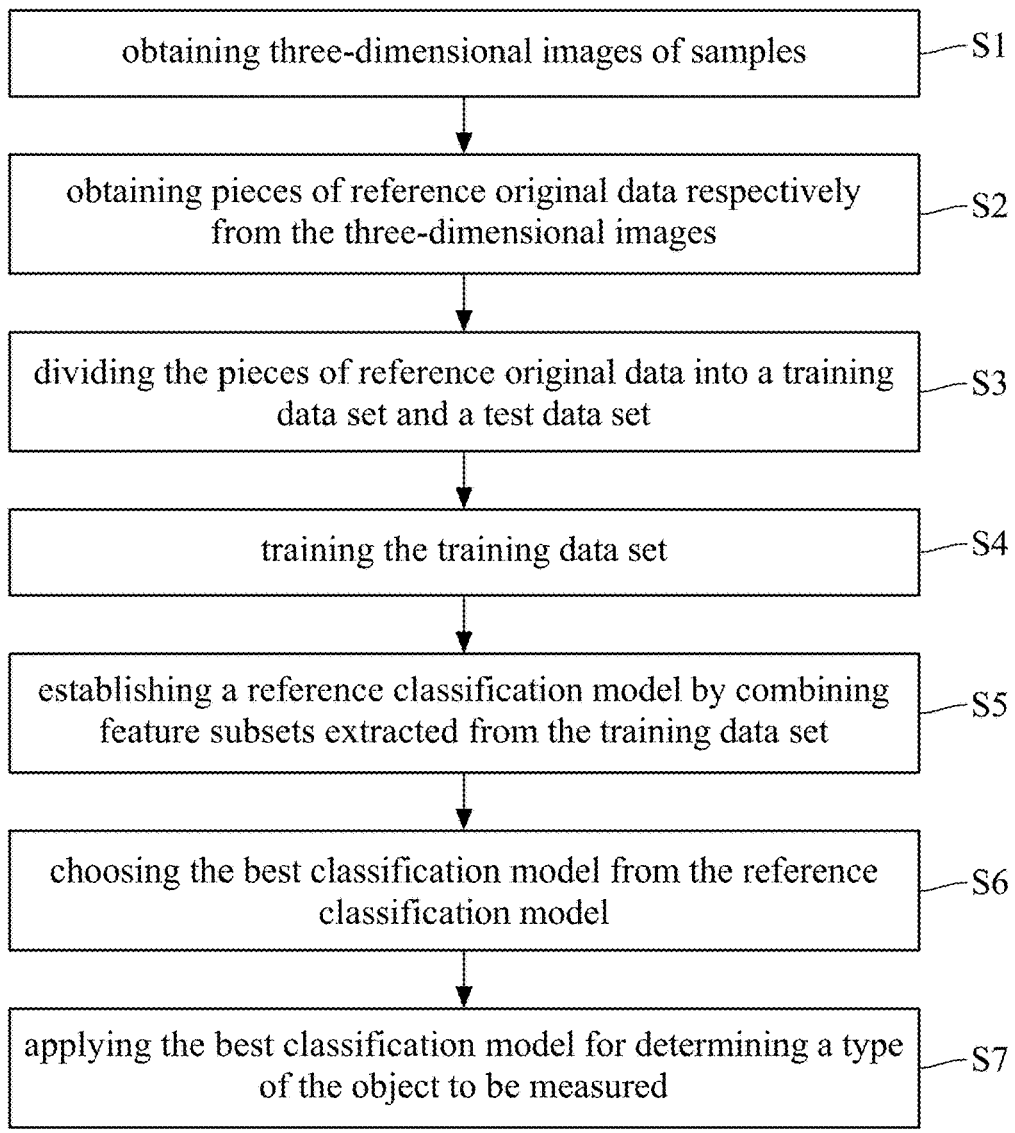
FIG. 4 is a flowchart of a classification procedure of an optical measurement system according to an embodiment of this disclosure.

The classifier 155 can perform a classification procedure. Please refer to FIG. 3 and FIG. 4, wherein FIG. 4 is a flowchart of a classification procedure performed by an optical measurement system according to an embodiment of this disclosure. As shown in FIG. 4, the classification procedure can comprise steps S1-S7, wherein steps S1-S5 can form a model establishing sub-procedure for establishing a reference classification model, and steps S6 and S7 can form a type determining sub-procedure for determining the type of the object to be measured.

In step S1, the classifier 155 obtains multiple 3D images of multiple modeling samples. More particularly, the optical element group 11, the controller 151 and the image processor 153 of the optical measurement system 1 can perform the aforementioned optical diffractive tomography method on multiple samples that belong to a single category so as to obtain multiple 3D images. The modeling samples that belong to the same category can have different types. For example, the modeling samples can include one or more CD4+T cells, one or more CD8+T cells, one or more B cells, etc. CD4+T cells, CD8+T cells and B cells all belong to cell category, but they respectively belong to CD4+T type, CD8+T type and B type. As aforementioned, the 3D images constructed by the image processor 153 can be stored in internal memory or external memory, and therefore, the classifier 155 can obtain the 3D images from the image processor 153 or the external memory.

In step S2, the classifier 155 obtains pieces of reference original data respectively from the 3D image, wherein the content of the reference original data varies depending on the category of the modeling samples. For the modeling samples belonging to biomolecules, such as cells, each piece of reference original data can represent structural features and biochemical characteristics of the corresponding modeling sample. More particularly, the structural features can also be referred to as morphological characteristics, and include the surface area and the volume of the modeling sample; the biochemical characteristics can include the protein density and the dry mass of the modeling sample. In this implementation, step S2 can comprise: according to the voxel data of each of the 3D images, obtaining the surface area and the volume of the corresponding one of the modeling samples to represent the structural features; and based on the local concentration of the non-aqueous molecules of the modeling samples, determining the protein density and the dry mass of each of the modeling samples to represent the biochemical characteristics. More particularly, step S2 can further comprise: when the modeling samples are substantially spherical, determining the sphericity of each of the modeling samples by the ratio of the volume to the surface area, wherein the volume and the surface area are obtained in the above-mentioned steps.

On the other hand, for the modeling samples belonging to non-biological molecules, such as polystyrene balls (PS balls), semiconductor elements and so on, each piece of reference original data can represent structural features and of the corresponding modeling sample. More particularly, the structural features can include the surface area and the volume of the modeling sample. In this implementation, step S2 can comprise: according to the voxel data of each of the 3D images, obtaining the surface area and the volume of the corresponding one of the modeling samples to represent the structural features. More particularly, step S2 can further comprise: when the modeling samples are substantially spherical, determining the sphericity of each of the modeling samples by the ratio of the volume to the surface area, wherein the volume and the surface area are obtained in the above-mentioned step. The above describes the embodiment in which the structural features and the biochemical characteristics are considered the reference original data and the embodiment in which merely the structural features are considered the reference original data. Moreover, in other embodiments, besides the structural features and/or the biochemical characteristics, the reference original data can further include the original images (2D images), corresponding to different projection directions, of the modeling sample and/or the 3D image of the modeling sample.

In steps S3-S5, the classifier 155 divides the pieces of reference original data into a training data set and a test data set, trains the training data set to extract multiple feature subsets, and establishes a reference classification model by combining these feature subsets. More particularly, the classifier 155 can randomly divide the pieces of reference original data into the training data set and the test data set, and train the training data set based on an algorithm. After the pieces of reference original data (such as structural features, biochemical characteristics, 2D images, 3D images) in training data set are trained, their weights are generated and they are sorted according to their weights, for example, from the highest to the lowest. In particular, the classifier 155 can train the training data set by K-nearest neighbors algorithm (K-NN algorithm); that is, the classifier 155 can be K-NN classifier. Moreover, the classifier 155 can be Linear classifier, Bayesian classifier, Maximum Likelihood classifier, Positive Boolean Function classifier, Linear Discriminant function classifier, Convolutional Neural Network (CNN) classifier, Support Vector Machine (SVM) classifier, Decision Tree classifier, Binary classifier, Logistic Regression classifier or other classifier. The classifier 155 can extract the feature subsets based on dimension reduction. For example, the classifier 155 can generate principal component feature subsets based on principal component analysis (PCA), and then combine the features subsets by a classifier algorithm (i.e. the algorithm used by one of the above multiple classifiers) to establish a reference classification model. The classifier 155 can store the reference classification model into internal memory of the processing device 15 or external memory (e.g. hard disk or cloud device).

In steps S6 and S7, the classifier 155 chooses the best classification model from the reference classification model, and applies the best classification model for determining the type of the object to be measured. More specifically, the best classification model may refer to the model with the most accurate classification result. FIG. 4 exemplarily illustrates the classification procedure in which the model establishing sub-procedure is performed on a single category of modeling samples to establish the reference classification model corresponding to said single category, and this reference classification model is chosen as the best classification model and applied for determining the type of the object to be measured. In another embodiment, the classifier 155 can perform the model establishing sub-procedure on each of various categories so as to establish multiple reference classification models respectively corresponding to different categories, and then choose the best classification model from these reference classification models, and apply the best classification model for determining the type of the object to be measured. In other words, the classifier 155 can perform a number of cycles of steps S1-S5, and then perform steps S6 and S7. The reference classification models respectively corresponding to different categories can include the reference classification model of cells, the reference classification model of polystyrene balls, the reference classification model of semiconductor elements, etc.

Figure 5:
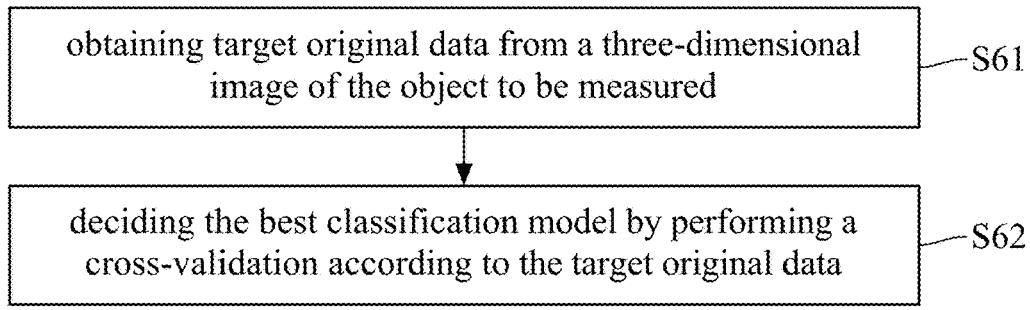
FIG. 5 is a partial flowchart of a classification procedure of an optical measurement system according to an embodiment of this disclosure.

For a further explanation of step 6, please refer to FIG. 5, which is a partial flowchart of a classification procedure of an optical measurement system according to an embodiment of this disclosure. Step S6 as shown in FIG. 4 can include steps S61 and S62 as shown in FIG. 5. In step S61, the classifier 155 obtains target original data from a 3D image of the object to be measured. More specifically, similar to the step of obtaining the 3D images of the modeling samples (step S1 in FIG. 4), the optical element group 11, the controller 151 and the image processor 153 of the optical measurement system 1 can perform the optical diffractive tomography method described in the aforementioned embodiment on the object to be measured so as to obtain a 3D image. Then, similar to the step of obtaining the reference original data from the 3D images of the modeling samples (step S2 in FIG. 4), the classifier 155 can obtain the target original data from the 3D image of the object to be measured, wherein the target original data can include all relevant features of all classification models that the classifier 155 has established. For example, the target original data can include structural features, biochemical characteristics, original images of the object to be measured which corresponding to different projection directions, and the 3D image of the object to be measured, which are similar to those in the aforementioned embodiment. In step S62, the classifier 155 decides the best classification model by performing a cross-validation according to the target original data. In particular, said cross-validation comprises a leave-one-out cross-validation (LOOCV).

Figure 6A:
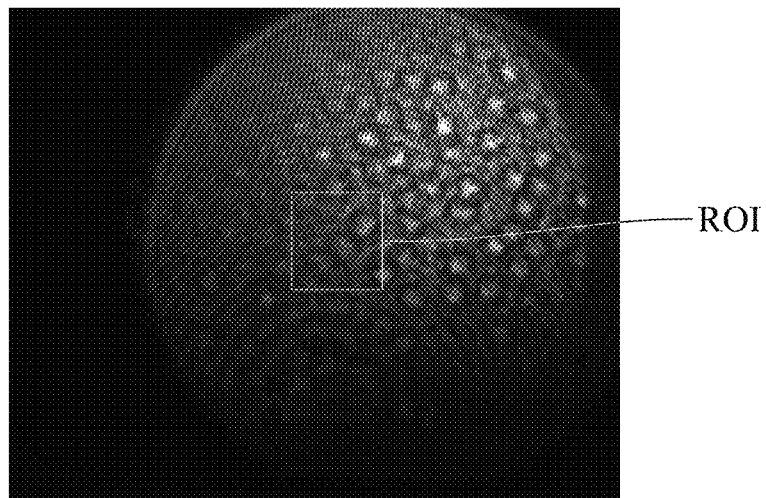
FIG. 6A is an original 3D image of a modeling sample or the object to be measured obtained by an optical measurement system according to an embodiment of this disclosure.
Figure 6B:
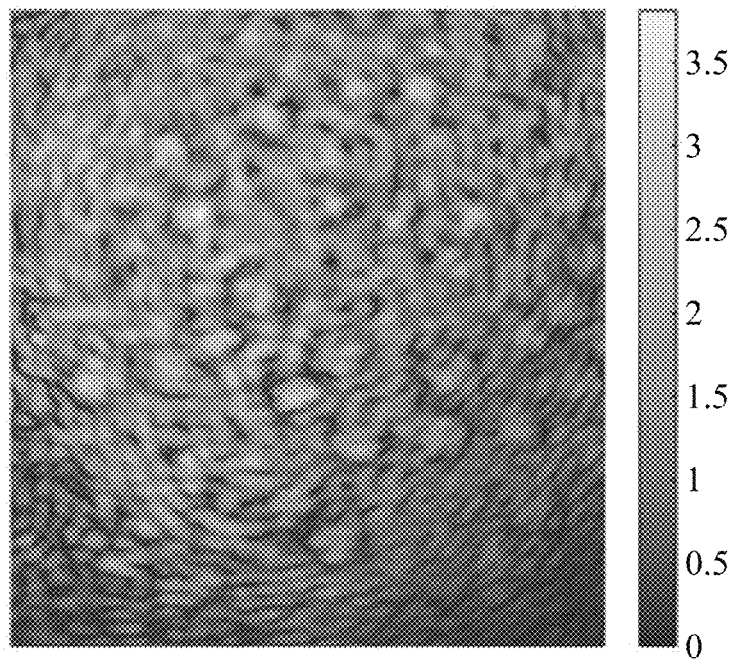
FIG. 6B exemplarily illustrates a 3D image corresponding to the region of interest ROI shown in FIG. 6A.
Figure 6C:
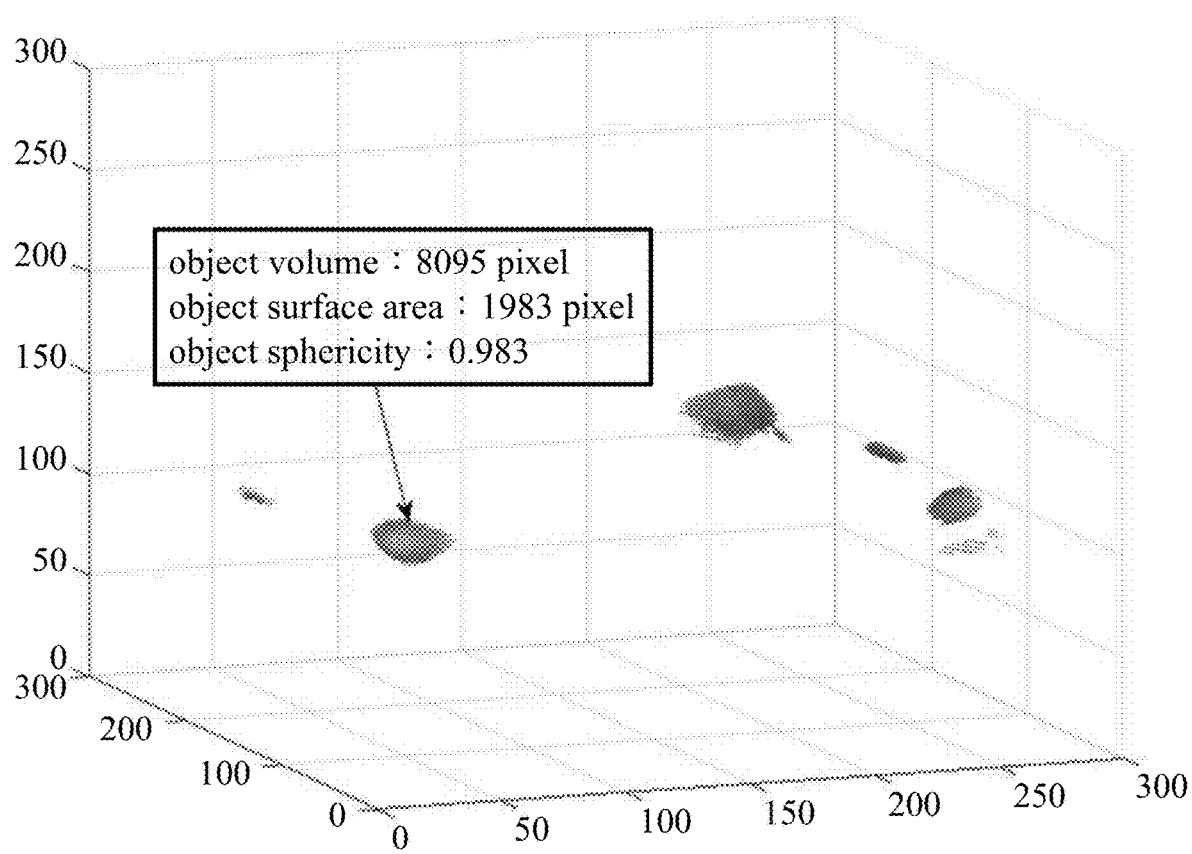
FIG. 6C illustrates the refractive index distribution after thresholding of a modeling sample or the object to be measured obtained by an optical measurement system according to an embodiment of this disclosure.

The operations of the optical element group 11, the camera 13 and the processing device 15 as described in the aforementioned embodiments can achieve imaging of a modeling sample or the object to be measured, and obtain data of the modeling sample or the object to be measured, such as structural features, biological characteristics, etc. Please refer to FIG. 3 and FIGS. 6A-6C, wherein FIG. 6A is the original 3D image of a modeling sample or the object to be measured obtained by an optical measurement system according to an embodiment of this disclosure, FIG. 6B exemplarily illustrates a 3D image composed of phase distribution images (hereinafter referred to as "3D phase image") corresponding to the region of interest ROI shown in FIG. 6A, and FIG. 6C illustrates the refractive index distribution after thresholding of a modeling sample or the object to be measured obtained by an optical measurement system according to an embodiment of this disclosure. The modeling sample or the object to be measured shown in FIGS. 6A-6C is a polystyrene ball. More particularly, the optical measurement system 1" can perform a 360-degree scan of the polystyrene ball by the optical element group 11 and the camera 13 so as to obtain multiple original images, and reconstruct an original 3D image as shown in FIG. 6A according to the original images by the processing device 15. The optical measurement system 1" can also obtain the phase distribution image of each original image by the processing device 15 to reconstruct the 3D phase image as shown in FIG. 6B, obtain a diagram of refractive index distribution of the polystyrene ball according to the 3D phase image, perform thresholding on the refractive index distribution to obtain the diagram as shown in FIG. 6C, and then analyze and display the original data of the object in the diagram, including volume, surface area, sphericity, etc.

Figure 7:
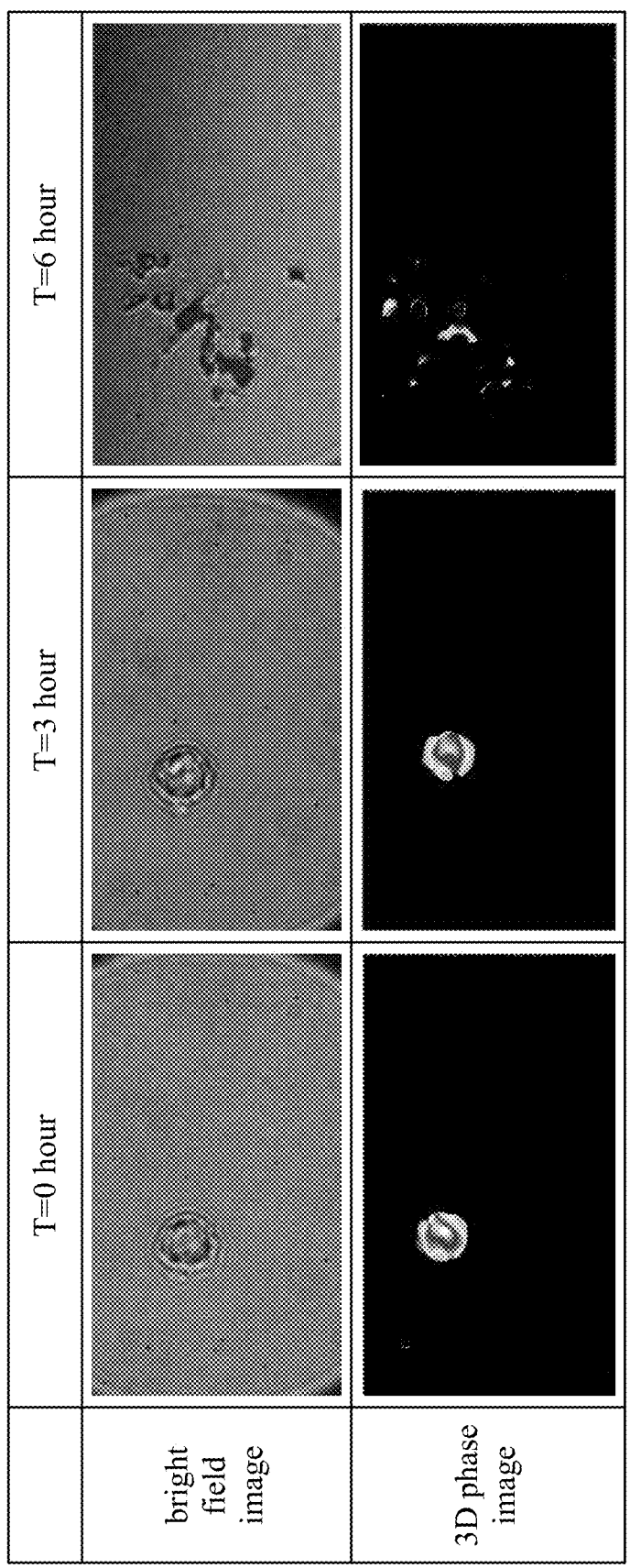
FIG. 7 shows 3D phase images of a modeling sample or the object to be measured obtained by an optical measurement system according to another embodiment of this disclosure.

Please refer to FIG. 3 and FIG. 7, wherein FIG. 7 illustrates a comparison table of 3D phase images and bright field images of a modeling sample or the object to be measured, wherein the 3D phase images are obtained by an optical measurement system according to an embodiment of this disclosure. The modeling sample or the object to be measured shown in FIG. 7 is a cancer cell. FIG. 7 shows the bright field images and 3D phase images of the cancer cell at different time points, especially showing the process of the necrosis of the cancer cell. More particularly, the optical measurement system 1" can perform a 360-degree scan of the cancer cell by the optical element group 11 and the camera 13 so as to obtain multiple original images, and obtain the phase distribution image of each original image so as to reconstruct the 3D phase image in FIG. 7. As shown in FIG. 7, in comparison with the bright field image with a time condition of "after six hours", the 3D phase image with the same time condition shows a more distorted and broken cell. While the bright field image merely shows the geometry of the cell, the phase image further contains the state of intracellular materials. Therefore, the 3D phase image obtained by the optical measurement system provided in this disclosure may better show the information about the cell state.

In view of the above, through the combination of the polarization beam splitter and the spatial light modulator, the optical measurement system provided in this disclosure may have good imaging effect. Moreover, with a specific optical imaging architecture and classification procedure, the optical measurement system provided in this disclosure may achieve label-free, rapid and accurate optical detection and classification. In terms of cell applications, the phase distribution image generated by the optical measurement system provided in this disclosure may show the information about the cell state more than a bright field image; thereby, the optical measurement system may effectively identify the cell type, assist in the isolation of immune cells and monitor cell quality.

What is claimed is:

1. An optical measurement system, comprising:
   a polarization beam splitter, dividing an incident beam into a reference beam and an original measurement beam;
   a first beam splitter, receiving the original measurement beam and reflecting the original measurement beam to form a first reflected measurement beam;
   a spatial light modulator, receiving the first reflected measurement beam and modulating a reflection direction of the first reflected measurement beam to form a modulated measurement beam;
   a condenser lens, receiving the modulated measurement beam and focusing the modulated measurement beam to an object to be measured, wherein the modulated measurement beam penetrates the object to be measured to form a penetrating measurement beam;
   an objective lens, receiving the penetrating measurement beam and converting the penetrating measurement beam into a parallel measurement beam;
   a mirror, receiving the parallel measurement beam and reflecting the parallel measurement beam to form a second reflected measurement beam;
   a second beam splitter, receiving the reference beam and reflecting the reference beam to a path coincident with a path of the second reflected measurement beam, wherein the reference beam interferes with the second reflected measurement beam to generate an interference signal;
   a camera, receiving the interference signal to generate an original image, wherein the original image comprises a phase distribution image having surface topography representative of the object to be measured; and
   a processing device, connected with the camera, wherein the processing device comprises an image processor, and the image processor obtains the phase distribution image using a field retrieval algorithm, and obtains a three-dimensional image of refractive index distribution of the object to be measured using information represented by the phase distribution image,
   wherein the processing device comprises a classifier performing a classification procedure, and the classification procedure comprises:
      obtaining three-dimensional images of samples, wherein the three-dimensional images respectively represent refractive index distribution of the samples;
      obtaining pieces of reference original data respectively from the three-dimensional images, wherein each of the pieces of reference original data represents structural features of a corresponding one of the samples;
      dividing the pieces of reference original data into a training data set and a test data set;
      training the training data set;
      establishing one of multiple reference classification models by combining feature subsets extracted from the training data set;
      choosing a best classification model from the multiple reference classification models; and
      applying the best classification model for determining a type of the object to be measured.

2. The optical measurement system according to claim 1, wherein the information presented by the phase distribution image and the three-dimensional image satisfy an equation, wherein the equation is:

$$U_{Rytov}(f_x, f_y, z^+ = 0) = \frac{1}{j4\pi f_z}(F_x, F_y, F_z);$$

wherein $U_{Rytov}(f_x, f_y, z^+=0)$ represents the three-dimensional image, and $(F_x, F_y, F_z)$ represents the information represented by the phase distribution image.

3. The optical measurement system according to claim 1, wherein
each of the pieces of reference original data further represents biochemical characteristics of the corresponding one of the samples.

4. The optical measurement system according to claim 3, wherein the step of obtaining the pieces of reference original data in the classification procedure comprises:
according to voxel data of each of the three-dimensional images, obtaining a surface area and a volume of a corresponding one of the samples to represent the structural features; and
based on local concentration of non-aqueous molecules of the samples, determining protein density and dry mass of each of the samples to represent the biochemical characteristics.

5. The optical measurement system according to claim 4, wherein the step of obtaining the pieces of reference original data in the classification procedure further comprises:
determining sphericity of each of the samples by a ratio of the volume to the surface area when the samples are substantially spherical.

6. The optical measurement system according to claim 3, wherein the step of training the training data set in the classification procedure performed by the classifier is performed by using a K-nearest neighbors algorithm.

7. The optical measurement system according to claim 3, wherein the step of choosing the best classification model in the classification procedure performed by the classifier is performed by performing a cross-validation.

8. The optical measurement system according to claim 7, wherein the cross-validation comprises a leave-one-out cross-validation.

9. The optical measurement system according to claim 1, wherein the step of obtaining the pieces of reference original data in the classification procedure comprises:
according to voxel data of each of the three-dimensional images, obtaining a surface area and a volume of a corresponding one of the samples to represent the structural features.

10. The optical measurement system according to claim 1, wherein the step of training the training data set in the classification procedure performed by the classifier is performed by using a K-nearest neighbors algorithm.

11. The optical measurement system according to claim 1, wherein the step of choosing the best classification model in the classification procedure performed by the classifier is performed by performing a cross-validation.

12. The optical measurement system according to claim 11, wherein the cross-validation comprises a leave-one-out cross-validation.

13. The optical measurement system according to claim 1, further comprising:
a spatial filter, disposed on a path of the incident beam to the polarization beam splitter for filtering out spatial noise of the incident beam; and
a half-wavelength plate, disposed on the path of the incident beam to the polarization beam splitter for rotating a polarization direction of the incident beam in which the spatial noise is filtered out by $\pi/2$.

14. The optical measurement system according to claim 1, further comprising:
a half-wavelength plate, disposed on a path of the incident beam to the polarization beam splitter for rotating a polarization direction of the incident beam by $\pi/2$.

15. The optical measurement system according to claim 14, further comprising:
a half-wavelength plate, disposed on a path of the reference beam to the second beam splitter for rotating a polarization direction of the reference beam reflected by the second beam splitter to be the same as a polarization direction of the second reflected measurement beam after penetrating the second beam splitter.

16. The optical measurement system according to claim 1, wherein the spatial light modulator is a digital micro-mirror device used in digital light processing (DLP).

17. The optical measurement system according to claim 1, wherein the spatial light modulator is a liquid crystal on silicon.

18. The optical measurement system according to claim 1, wherein intensity of the reference beam is approximately equal to intensity of the modulated measurement beam.

* * * * *